July 1, 1958
M. E. BOURNS ET AL
2,841,674
PRESSURE RESPONSIVE INSTRUMENT
Filed Jan. 5, 1954
2 Sheets-Sheet 1
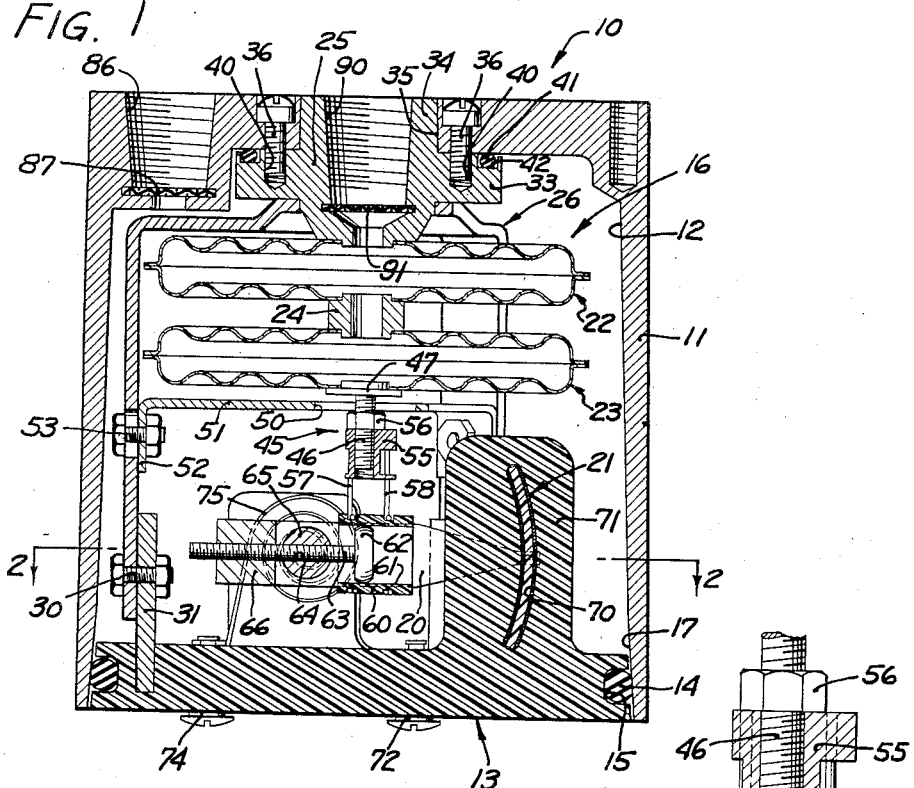
INVENTORS
MARLAN E. BOURNS
MARVIN E. HARRISON
BY *Herbert E. Kidder*
AGENT July 1, 1958     M. E. BOURNS ET AL     2,841,674
PRESSURE RESPONSIVE INSTRUMENT Filed Jan. 5, 1954     2 Sheets-Sheet 2

INVENTORS
MARLAN E. BOURNS
MARVIN E. HARRISON
BY Herbert E. Fidder
AGENT

United States Patent Office 2,841,674
Patented July 1, 1958

2,841,674
PRESSURE RESPONSIVE INSTRUMENT

Marlan E. Bourns and Marvin E. Harrison, Riverside, Calif.; said Harrison assignor to said Bourns Application January 5, 1954, Serial No. 402,384

4 Claims. (Cl. 201—48)

The present invention relates to pressure responsive instruments, and more particularly, to instruments of this type embodying potentiometers, which produce a voltage output that is a function of the pressure applied thereto. The primary object of the invention is to provide a new and improved pressure responsive instrument that is relatively simple and inexpensive to manufacture, easily adjusted, and extremely accurate in response.

One important object of the invention is to provide an instrument of the class described, wherein the pressure sensitive element, contact member, resistance element, and all other functional parts are mounted on a plastic lid which is attached to the housing and is removable therefrom as a sub-assembly, thereby facilitating assembly and service of the unit.

Another object of the invention is to provide an instrument wherein the contact arm and resistance element are supported on bosses molded integrally with the plastic lid, while the supporting structure carrying the pressure sensitive element is secured to lugs that are embedded in the lid.

A further object of the invention is to provide a novel connection between the pressure sensitive element and the contact member, whereby movement of the element swings the contact member along the length of the resistance element. In one embodiment of the invention, a tube or barrel is connected to the pressure sensitive element, and disposed within the tube is a spherically curved disk that is mounted on an arm attached to the pivot shaft of the contact arm. This disk fits snugly within the tube, and is free to rock therein as the tube moves up and down. In another embodiment, the tube is replaced by a slotted link which functions in the same manner as the tube; while a third embodiment uses a flat-surfaced magnet that holds the spherically curved disk against it by magnetic attraction.

Still another object of the invention is to provide a new and unique arrangement whereby the contact arm and connecting linkage are balanced by means of a counterweight, thereby minimizing the effects of vibration or acceleration.

A further object of the invention is to provide a novel construction for a differential pressure unit, wherein one pressure is admitted to the interior of the housing, while another pressure is admitted to the interior of the bellows unit. In this case, the instrument measures the difference between the two pressures.

The foregoing and other objects and advantages of the present invention will become apparent to those skilled in the art upon consideration of the following detailed description of the preferred embodiment thereof, reference being had to the accompanying drawings, wherein;

Figure 1 is a vertical section, taken at 1—1 in Figure 2, through a pressure responsive instrument embodying the principles of our invention;

Figure 2 is a transverse section through the same, taken at 2—2 in Figure 1;

Figure 3 is an enlarged fragmentary sectional view, taken at 3—3 in Figure 2;

Figure 4:
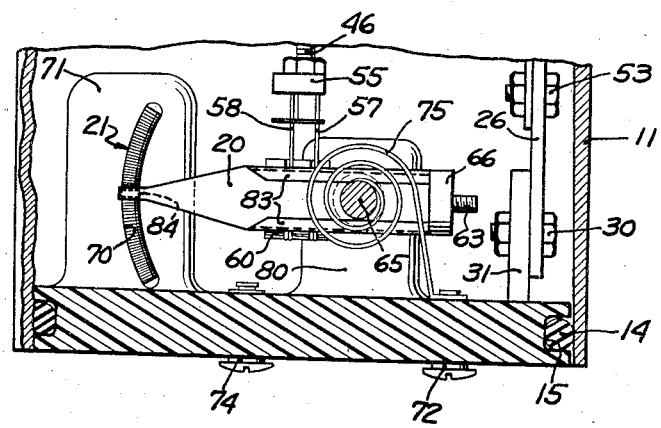
Figure 4 is a sectional view taken at 4—4 in Figure 2.

In the drawings, the instrument illustrating the principles of the invention is a pressure potentiometer, designated generally by the reference number 10, which comprises a cylindrical metal housing 11, having a cavity 12 projecting inwardly from one end thereof. The open end of the housing 11 is closed by a lid 13 of non-conductive plastic material, such as one of the phenolic resins. The lid 13 is inserted into the end of the cavity 12, and the clearances between the lid and the housing are sealed by an O-ring 14 which is seated within a circumferential groove 15 in the edge of the lid. The housing wall at the open end of the cavity is flared at 17 to facilitate insertion of the lid therein, and to permit drawing the lid into snug seating engagement with the housing.

Mounted within the cavity of the housing is a pressure sensitive element 16, which is operatively connected to a contact arm 20 that wipes on a resistance element 21. The pressure sensitive element 16 may take other forms than that illustrated, but in the preferred form comprises two bellows wafers 22 and 23, which are formed of corrugated sheet metal disks and joined together at their centers by a hollow bushing 24. The bellows unit 16 is attached at its top end by a fitting 25 to an inverted tripod support 26, the legs of which are secured by screws 30 to three equidistantly spaced lugs 31 embedded in and projecting upwardly from the plastic lid 13.

The fitting 25 connecting the bellows unit 16 to the tripod support 26 also has a radial flange 33, which bears against the inside surface of the end of the housing 11; and a hub portion 34, which projects through a hole 35 in the end of the housing. Screws 36 extend through holes in the end of the housing and are threaded into tapped holes 40 in the flange 33. An O-ring 41 seated within a groove 42 in the flange 33, seals the clearances between the fitting 25 and the bottom of the housing.

The bottom end of the bellows unit 16 is free to move vertically in response to variations in the pressure differential between the inside and outside of the bellows unit, and is operatively connected to the contact arm 20 through the medium of a link member 45. The link 45 is in the form of a screw threaded stud 46, having a head 47 that is soldered to the bottom wall of the lower wafer 23. The stud 46 extends down through a hole 50 in a plate 51 having downwardly bent ears 52 that are secured by screws 53 to the legs of the tripod support 26. The function of the plate 51 is to limit extension of the bellows unit 16.

Screwed onto the bottom end of the stud 46 is a nut member 55, which is locked to the stud by a jam nut 56. As best shown in Figure 3, a pair of laterally spaced wires 57 and 58 are attached at their ends to the nut member 55 and extend downwardly therefrom; both of said wires having loops 59 formed at their bottom ends which encircle a plastic tube or barrel 60 and are seated in circumferential grooves therein. The barrel 60 is provided with a cylindrical bore 61, and is held by the wires 57, 58 with the bore 61 extending in a horizontal plane, perpendicular to a pivot shaft 65. Disposed within the bore 61 and touching lightly against the inner surface thereof around substantially its entire circumference, is a spherically rounded knob or disk 62, which is rigidly attached to one end of a screw shaft 63 and forms the head thereof. The center of spherical curvature is at the longitudinal centerline of the screw shaft 63. The screw 63 is threaded through a tapped hole 64 in the pivot shaft 65, and projects from the opposite side thereof. A counterweight 66 is threaded onto the projecting end of the screw opposite the disk 62.

The plastic barrel 60 has two functions: first, it insulates the bellows and link 45 from the contact arm 20; and second, it provides an adjustable moment arm through which the thrust of the bellows unit 16 is applied to the pivot shaft 65. Adjustment of the moment arm is obtained by turning the screw 63 one way or the other through the tapped hole in the pivot shaft 65, during which operation the disk 62 turns freely within the bore 61. The counterweight 66 is adjusted by screwing it one way or the other along the threaded shaft 63. Because of the spherical curvature of its peripheral edge, the disk 62 acts within the bore 61 like a ball within a cylinder, and full contact is maintained at all times between the barrel 60 and the disk for all positions of the barrel within the range of the instrument. This arrangement also permits axial adjustment of the disk 62 and screw 63 without in any way affecting the fit or clearance between the disk and the barrel.

The resistance element 21 is preferably in the form of a wire-wound card, which is bent into an arc and inserted into a curved slot 70 formed in an upwardly projecting boss 71 that is molded integrally with the lid 13. The element 21 is cemented in place in the boss 71, and the ends of the wire windings are connected to terminals 72 and 73 (Figure 2), which are molded into the lid. A third terminal 74 is connected to the contact arm 20 by means of a torsion spring 75, which is attached to the pivot shaft 65. The pivot shaft 65 is pivotally supported between two ball bearings 76 and 77 that are mounted in laterally spaced, upwardly projecting bosses 80 and 81, which are molded integrally with the lid 13. Bearing 76 is pressed into place in a shouldered seat in boss 80, while bearing 77 is confined within boss 81 by a threaded plug 82 of larger diameter than the outer race of the bearing. This arrangement permits accurate location of the bearings 76 and 77 within the bosses 80, 81, and also facilitates assembling.

The contact arm 20 is rigidly attached to the pivot shaft 65 and is preferably formed of sheet metal, with bent up, converging edged portions 83, which stiffen the base portion of the arm against bending. The outer end of the contact arm is unreinforced, and is flexible to provide resilient pressure of the contact pellet 84 against the edge of the resistance element. The contact pellet 84 is soldered or otherwise rigidly fixed to the end of the arm 20.

The instrument illustrated in the drawings is intended for use as a differential pressure gage, and to that end is provided with a tapped hole 86 in the bottom of the housing 11 to receive a tube fitting, through which fluid pressure from a first source is admitted to the interior of the housing. A screen 87 is secured within the tapped hole 86 to prevent the entrance of dirt or other foreign material. Fluid pressure from another source is introduced into the interior of the bellows unit 16 through a tapped hole 90.

Figure 5:
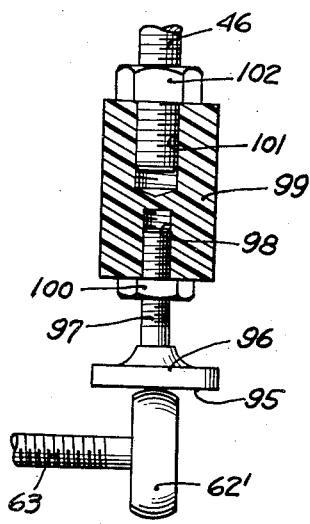
Figure 5 is an enlarged fragmentary view of another embodiment of the linkage arrangement shown in Figure 3.

Another form of linkage connecting the bellows unit 16 with the threaded shaft 63 is shown in Figure 5. In this case, the spherically rounded disk 62' on the end of the threaded shaft 63 is held by magnetic attraction against the flat bottom face 95 of a magnet 96. The magnet 96 is a permanent magnet, and disk 62' is made of magnetically attractive material. A threaded stem 97 projects upwardly from the magnet 96, and is screwed into a tapped hole 98 in a plastic insulator 99. A jam nut 100 locks the threaded shaft 97 in adjusted position. Extending down into the insulator 99 from the top end thereof is a tapped hole 101, into which the threaded stud 46 of the bellows unit 16 is screwed. A jam nut 102 locks the insulator 99 to the stud 46.

The principle of operation is substantially the same as in the preceding embodiment. The spherically rounded disk 62' is held by magnetic attraction against the flat face 95, and its spherical curvature permits a wide range of angular displacement between the shaft 63 and the magnet 96. The disk 62' can also turn freely with respect to the magnet, to permit adjustment of the effective length of the screw shaft 63. The principal difference between the two forms is that the disk 62' can be pulled away from the magnet 96 under excessive force, whereas no such separation is permitted in the embodiment of Figures 1 to 4.

Figure 6:
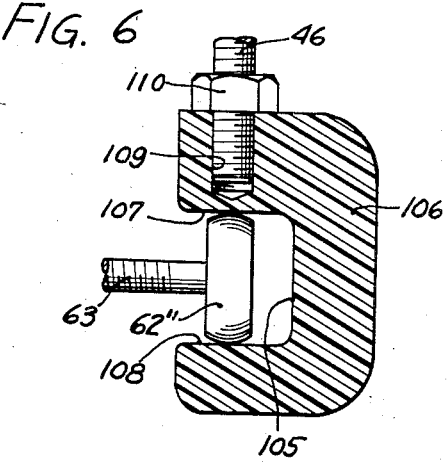
Figure 6 is a similar view of still another embodiment.

A third form of linkage connection between the bellows unit and the threaded shaft 63 is illustrated in Figure 6. In this case, the disk 62 is received within a notch 105 cut into one side of a plastic insulator 106. The disk 62'' fits closely between the top and bottom edges 107, 108 of the notch 105, and functions in the same manner as a ball confined between two parallel plane surfaces. A tapped hole 109 in the top end of the plastic insulator 106 receives the threaded stud 46, and the insulator is locked to the stud by a jam nut 110. As in the preceding embodiments, the disk 62'' is free to rock through a limited range without affecting the clearance between the disk and the surfaces 107, 108, and also turns freely with respect to the insualtor 106, to permit adjustment of the screw shaft 63. The disk 62'' is confined both top and bottom, and is not separable from the plastic insulator 106.

The operation and advantages of the invention are believed to be more or less self evident from the illustrations and the foregoing description. When the instrument 10 is to be used as a differential pressure gage, pressure from one source is admitted to the interior of the housing through the tapped hole 86, while pressure from another source is admitted to the interior of the bellows unit through the tapped hole 90. In this case, the travel of the bellows unit depends upon the difference between the two pressures. Expansion or contraction of the bellows unit 16 causes the tube 60 to move downwardly or upwardly, as the case may be, and this rocks the screw shaft 63 and pivot shaft 65, causing the contact arm 20 to move downwardly or upwardly along the resistance element 21.

If it is desired to use the instrument as an absolute pressure gage, the interior of the housing would be exhausted to a high vacuum, and the tapped hole 86 would be plugged. Fluid pressure would then be admitted to the interior of the bellows unit 16 through the tapped hole 90. Alternatively, the interior of the bellows unit 16 might be exhausted to a high vacuum and sealed. Fluid pressure would then be admitted to the interior of the housing.

The advantages of the counterweight 66 will be obvious to those skilled in the art. The counterweight balances the mass of the contact arm 20, and the disk 62, and an appropriate portion of the mass of the bellows. By thus balancing the mass on opposite sides of the pivot shaft 65, the effect of vibration or acceleration on the contact arm and bellows unit assembly is minimized or eliminated altogether. The counterweight is readily adjusted to any position along the screw shaft 63 by merely turning it one way or the other. The screw shaft 63 is also adjustable through the pivot shaft 65 to lengthen or shorten the moment arm through which the force of the bellows unit is applied to the shaft 65. The linkage assembly shown in Figures 3, 5, and 6 accommodate this adjustment of the length of the moment arm, and also permit the disk 62 to rotate with respect to the barrel 60 or magnet 96, or plastic insulator 106.

While we have shown and described in considerable detail what we believe to be the preferred form of our invention, it will be understood that these embodiments are merely illustrative, and that various changes may be made in the shape and arrangement of the several parts

We claim:

1. A pressure responsive instrument comprising a housing having a cavity extending inwardly from one side thereof, a lid on said one side of said housing enclosing said cavity, a supporting structure attached to said lid and holding the latter in place on said housing, means for attaching said structure to said housing, a pressure sensitive element mounted on said supporting structure, said attaching means including an opening extending through the wall of said housing and communicating with the interior of said pressure sensitive element, whereby fluid pressure may be admitted to the interior of said pressure sensitive element, a resistance element mounted on said lid, a movable contact member supported on said lid and wiping on said resistance element, and an operating connection between said pressure sensitive element and said contact member.

2. A pressure responsive instrument comprising a housing having a cylindrical cavity extending inwardly from one side thereof, a circular lid received within the open end of said cavity, an O-ring sealing the clearance between said lid and said housing, a supporting structure attached to said lid, a fitting attached to said supporting structure and extending through a hole in said housing at the bottom of said cavity, said fitting being attached to said housing, a pressure sensitive element mounted on said supporting structure, said fitting having a passageway provided therein communicating with the interior of said pressure sensitive element, a resistance element mounted on said lid, a movable contact member supported on said lid and wiping on said resistance element, and an operating connection between said pressure sensitive element and said contact member.

3. A pressure responsive instrument comprising a housing having a cavity extending inwardly from one side thereof, a lid on said one side of said housing enclosing said cavity, a supporting structure attached to said lid and extending to adjacent the bottom of said cavity, a fitting attached to said supporting structure and inserted into an opening in the bottom of said cavity, a pressure sensitive element attached at one end to said fitting, said fitting having a passageway extending from the outside of said housing to the inside of said pressure sensitive element, whereby pressure can be admitted to the interior of the pressure sensitive element, a resistance element mounted on said lid, and a movable contact member operatively connected to the other end of said pressure sensitive element and wiping on said resistance element.

4. A pressure responsive instrument comprising a housing having a cavity extending inwardly from one side thereof, a member mounted on said housing to enclose said cavity, a supporting structure on the inner side of said member extending toward the bottom of said cavity, a pressure sensitive element mounted on said supporting structure, another member attached to said supporting structure and projecting through an opening in the wall of said housing at the bottom of said cavity, said other member being connected to said pressure sensitive element and providing means for introducing fluid pressure to the interior thereof, one of said members being fixedly secured to said housing and the other member being movable with respect thereto, a resistance element mounted on said first-named member, a movable contact wiping on said resistance element, and an operating connection between said pressure sensitive element and said contact member.

References Cited in the file of this patent

UNITED STATES PATENTS

| | | |
|---|---|---|
| 1,064,555 | Simmance et al. | June 10, 1913 |
| 2,159,513 | Taylor | May 23, 1939 |
| 2,302,713 | Paulin | Nov. 24, 1942 |
| 2,332,565 | Fairbanks | Oct. 26, 1943 |
| 2,443,252 | Kelly | June 15, 1948 |
| 2,506,503 | Hilgert | May 2, 1950 |
| 2,523,213 | Hilgert | Sept. 19, 1950 |
| 2,622,177 | Klose | Dec. 16, 1952 |

FOREIGN PATENTS

| | | |
|---|---|---|
| 201,411 | Great Britain | Aug. 2, 1923 |